W. E. FERRIS.
DOUBLE END SPRING HANGER.
APPLICATION FILED APR. 19, 1917.
1,289,140.
Patented Dec. 31, 1918.
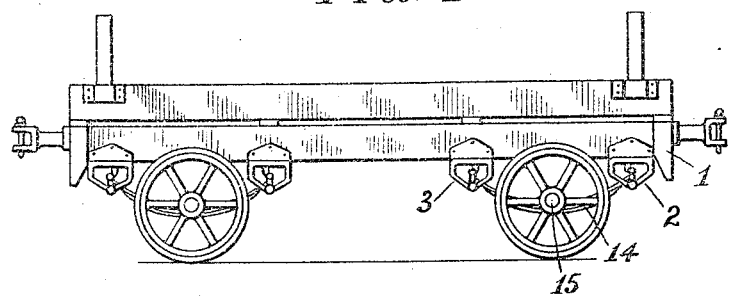
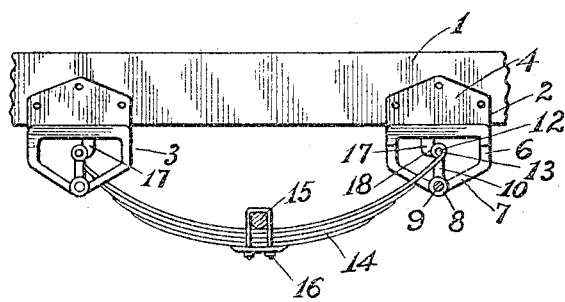
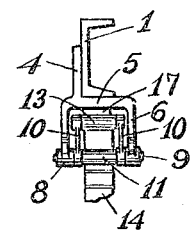
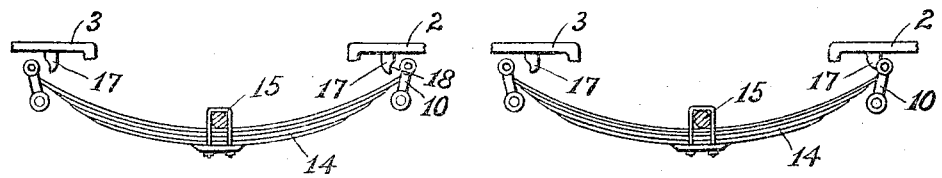
Inventor
William E. Ferris
By E. F. Dunstan,
his Attorney

UNITED STATES PATENT OFFICE.

WILLIAM E. FERRIS, OF EAST CLEVELAND, OHIO, ASSIGNOR TO THE OHIO TRAILER COMPANY, OF CLEVELAND, OHIO, A CORPORATION OF OHIO.

DOUBLE-END SPRING-HANGER.

1,289,140.     Specification of Letters Patent.     Patented Dec. 31, 1918.

Application filed April 19, 1917. Serial No. 163,152.

*To all whom it may concern:*

Be it known that I, WILLIAM E. FERRIS, a citizen of the United States, residing at East Cleveland, in the county of Cuyahoga and State of Ohio, have invented certain new and useful Improvements in Double-End Spring-Hangers, of which the following is a specification.

This invention relates to double end spring hangers for automobile trailers or other vehicles.

The main object of the invention is to provide a simple and inexpensive means for resiliently supporting a trailer body from the axles, including means for limiting the forward and backward movements of the trailer body with relation to the axles, in order that either end of the trailer may be coupled to an automobile for drawing the same. This is accomplished by pivotally connecting the ends of the ordinary axle supported leaf springs between pairs of links, and pivotally supporting these links from castings, which are provided with stop blocks for limiting the longitudinal movements of the springs.

In order that the invention may be clearly understood, the same will be hereinafter fully described in connection with the accompanying drawings, which simply serve to illustrate the invention, and the novel features thereof will be particularly pointed out in the appended claims.

In the drawing like characters are used to designate corresponding parts.

Figure 1 is a side elevation of a trailer having supporting springs constructed and hung in accordance with my invention, there being no load on the trailer, Fig. 2 is an enlarged side view of one of the springs, one side of a hanger being broken away to better show the construction, Fig. 3 is an end view of Fig. 2, Fig. 4 illustrates the spring when the trailer is loaded, and Fig. 5 is a similar view to Fig. 4 illustrating the action of the spring when the trailer is loaded and traveling under a pulling force.

Referring to the drawings, 1 represents the usual channel iron frame of an ordinary trailer, to the sides of which, at the forward and rear ends of the trailer, are fixed pairs of transversely alining hangers 2 and 3. Each hanger consists of a side plate 4, and a flange 5 formed integral therewith and extending at a right angle thereto for conveniently fitting the channel iron frame. From the longitudinal edges of the flange 5 depend a pair of side frames, which consist of pairs of vertical side bars 6 and inclined bars 7.

At the juncture of said inclined bars are transversely alining bosses 8 for receiving a pivot pin 9, which supports a pair of spaced links 10. Spacing sleeves 11 are arranged on the pivot pins 9. Arranged between and pivoted to the free ends of said links, at 12, are the rolled eye ends 13 of ordinary leaf springs 14, which are suitably connected to and supported by the axles 15, as indicated at 16. Extending transversely of and projecting from the underside of the flange 5 of each hanger is a stop block 17, the purpose of which is to limit the forward and backward movements of the frame of the trailer with relation to the springs. This is brought about by the striking of the stop blocks against the rolled eye ends 13 of the springs and being held in engagement therewith under the pulling force exerted upon the frame of the trailer. The stop blocks 17 are slightly rounded out at 18 for accommodating the rolled eye ends of the springs.

The action of the springs when the trailer is in motion will now be described. The springs 14 are so constructed and the hangers 2 and 3 so positioned on the frame that the rolled eye ends 13 of the springs will normally engage the stop blocks 17. When the trailer is loaded, the weight upon the pivot pins 9 forces the rolled eye ends of the springs downwardly as the pressure is resisted by the axles, thereby causing the springs to straighten out according to the load. Both of the rolled eye ends of the springs are then in spaced relation to the stop blocks, as shown in Fig. 4. As soon as a pulling force is exerted on the frame of the trailer, the frame tends to move forward while the springs remain stationary, until the stop blocks strike the forward rolled eye ends of the springs, as shown in Fig. 5. The pulling force will then be exerted on the axles and the trailer caused to travel forward. A pulling force applied to the other end of the frame of the trailer will cause the other stop blocks to strike the opposite rolled ends of the springs with the same results as just described. Due to the unevenness of the roadway, the frame of the trailer tends to vibrate up and down and longitudinally upon the springs, and by supporting the ends of springs and providing stop block as disclosed, resiliency is obtained within a proper limitation of action.

Having fully described my invention, what I claim is:

1. In a spring hanger for vehicles, the combination of an axle supported on wheels, a curved spring supported by the axle and having upturned ends, a frame, pairs of hangers fixed to the frame, links pivotally connected to the hangers and extending upwardly, the ends of the springs being pivoted to the free ends of the links, and stop blocks carried by the hangers for engaging the ends of the springs to limit the longitudinal movements of the hangers with relation to the non-adjacent ends of the springs, substantially as described.

2. In a spring hanger for vehicles, the combination of an axle supported on wheels, a curved spring supported by the axle and having upturned ends, a frame, pairs of hangers fixed to the frame, the hangers having flanges, sides depending from the longitudinal edges of the flanges, links pivotally connected to the sides of the hangers and extending upwardly, the ends of the springs being pivoted to the free ends of the links, and stop blocks carried by the flanges of the hangers for engaging the ends of the springs to limit the longitudinal movements of the hangers with relation to the non-adjacent ends of the springs, substantially as described.

3. In a spring hanger for vehicles, the combination of an axle supported on wheels, a curved spring supported by the axle and having upturned ends, a frame, pairs of hangers fixed to the frame, links pivotally connected to the hangers and extending upwardly, the ends of the springs being pivoted to the free ends of the links, and means for limiting the longitudinal movements of the hangers with relation to the non-adjacent ends of said springs, substantially as described.

In testimony whereof I affix my signature.

WILLIAM E. FERRIS.

Copies of this patent may be obtained for five cents each, by addressing the "Commissioner of Patents, Washington, D. C."